United States Patent [19]

Toyoshima

[11] Patent Number: 5,239,694

[45] Date of Patent: Aug. 24, 1993

[54] TRANSMITTER HAVING BATTERY POWER DETECTING MEANS

[75] Inventor: Akihiko Toyoshima, Saitama, Japan

[73] Assignee: Sony Corporation, Tokyo, Japan

[21] Appl. No.: 704,778

[22] Filed: May 23, 1991

[30] Foreign Application Priority Data

May 31, 1990 [JP] Japan .............................. 2-057351[U]

[51] Int. Cl.$^5$ ............................................. H04B 17/00
[52] U.S. Cl. ....................................... 455/115; 455/127
[58] Field of Search ................ 455/115, 117, 127, 343; 324/427, 428

[56] References Cited

U.S. PATENT DOCUMENTS

| | | |
|---|---|---|
| 3,870,959 | 3/1975 | Wootton ............................... 455/127 |
| 3,971,980 | 7/1976 | Jungfer et al. ....................... 324/428 |
| 4,471,492 | 9/1984 | Mann et al. . |
| 4,709,404 | 11/1987 | Tamura et al. . |
| 4,887,311 | 12/1989 | Garner et al. ....................... 455/186.1 |
| 4,893,348 | 1/1990 | Andoh . |
| 4,914,393 | 4/1990 | Yoshido .............................. 324/428 |

FOREIGN PATENT DOCUMENTS

0203781A1 12/1986 European Pat. Off. .
0212829 12/1982 Japan .................................. 455/127

Primary Examiner—Reinhard J. Eisenzopf
Assistant Examiner—Edward Urban
Attorney, Agent, or Firm—Philip M. Shaw, Jr.

[57] ABSTRACT

A transmitter having a battery therein and which is driven by a voltage supplied from the battery is comprised of an input key pad having operation keys for inputting transmission data, a data length detecting unit for detecting a length of the input transmission data, a voltage supervisory unit for detecting an output voltage of the battery, a discharge characteristic memory for previously storing a discharge characteristic of the battery, and a calculating unit for calculating data length which can be transmitted on the basis of a voltage value detected by the voltage supervisory unit and discharge characteristic data stored in the discharge characteristic memory, wherein when the data length detected by the data length detecting unit is longer than the data length which can be transmitted, the transmission data is inhibited from being transmitted. Thus, communication can be increased in reliability.

6 Claims, 2 Drawing Sheets

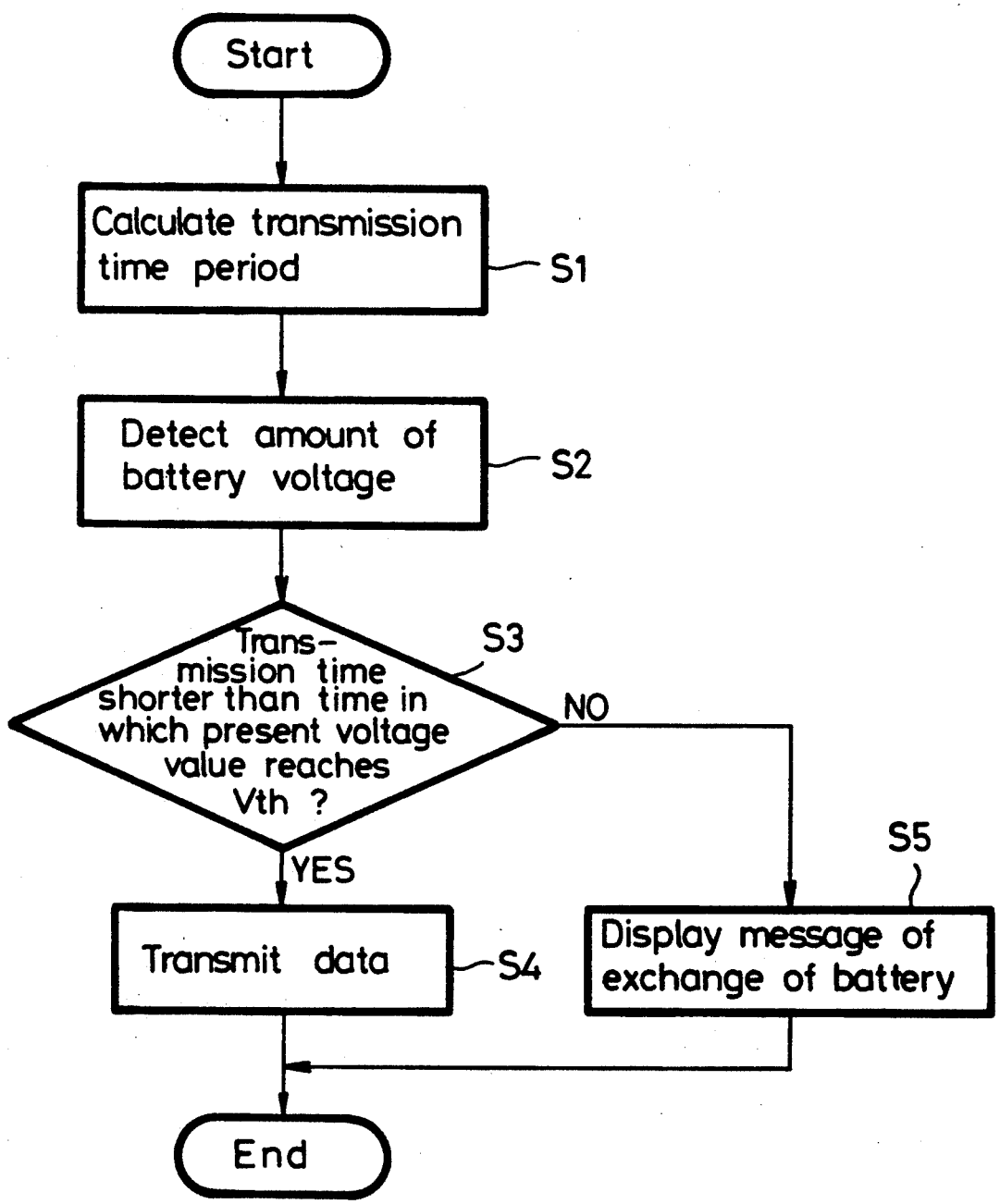

TRANSMITTER HAVING BATTERY POWER DETECTING MEANS

BACKGROUND OF THE INVENTION

1. Field of the Invention

The present invention generally relates to transmitting apparatus and, more particularly, is directed to a transmitter which is driven by battery power.

2. Description of the Prior Art

Recently, various kinds of communication apparatus mounted on a mobile station such as automobiles and so on or portable communication apparatus have been developed so far. Since this kind of communication apparatus for a mobile station or portable communication apparatus is not supplied with an AC voltage, such mobile or portable communication apparatus is generally supplied with and driven by a drive voltage from a housed secondary battery. The secondary battery will hereinafter simply referred to as a battery.

In such communication apparatus driven by battery power, there is a risk that the transmission becomes impossible when an output voltage of battery is lowered during transmission. That is, if the amount of voltage consumed by the communication exceeds the charged amount of the battery, then the output voltage is lowered than the voltage necessary for transmission. As a consequence, the communication apparatus becomes unable to operate unless the battery is exchanged or charged. If the output voltage of the battery is lowered during transmission, then the transmission is ended before it reaches to the end an only one portion of transmission data is transmitted to the receiving side so that reception error occurs in the receiving side. In that event, if the communication apparatus is utilized as a standard telephone to transmit an audio signal, then the user (caller) can immediately notice that the battery is dead because the user directly utilizes this communication apparatus. Therefore, the user can be substantially prevented from being troubled even when the battery is dead. On the other hand, if such reception error occurs during the communication of various data, then the receiving side cannot be controlled at all by the transmission data. Also, there is little possibility that the user can notice that the battery is dead, which considerably troubles the user.

OBJECTS AND SUMMARY OF THE INVENTION

Accordingly, it is an object of the present invention to provide a transmitter having battery power detecting means in which the aforementioned shortcomings and disadvantages of the prior art can be eliminated.

More specifically, it is an object of the present invention to provide a transmitter having battery power detecting means which can avoid a communication trouble caused when a battery is dead.

It is another object of the present invention to provide a transmitter having battery power detecting means in which reliability thereof can be increased.

It is a further object of the present invention to provide a transmitter having battery power detecting means in which a time for exchanging a battery can be known positively so that this transmitter becomes easy to handle.

As an aspect of the present invention, a transmitter having a battery therein and which is driven by a voltage supplied from the battery is comprised of an input key pad having operation keys for inputting transmission data, a data length detecting unit for detecting a length of the input transmission data, a voltage supervisory unit for detecting an output voltage of the battery, a discharge characteristic memory for previously storing a discharge characteristic of the battery, and a calculating unit for calculating data length which can be transmitted on the basis of a voltage value detected by the voltage supervisory unit and discharge characteristic data stored in the discharge characteristic memory, wherein when the data length detected by the data length detecting unit is longer than the data length which can be transmitted, the transmission of the transmission data is inhibited. Thus, communication can be increased in reliability.

The above and other objects, features, and advantages of the present invention will become apparent from the following detailed description of an illustrative embodiment thereof to be read in conjunction with the accompanying drawings.

BRIEF DESCRIPTION OF THE DRAWINGS

FIG. 3 is a flowchart to which references will be made in explaining operation of the embodiment of the present invention.

DETAILED DESCRIPTION OF THE PREFERRED EMBODIMENT

An embodiment of the transmitter having battery power detecting means according to the present invention will now be described with reference to the accompanying drawings.

Figure 1:
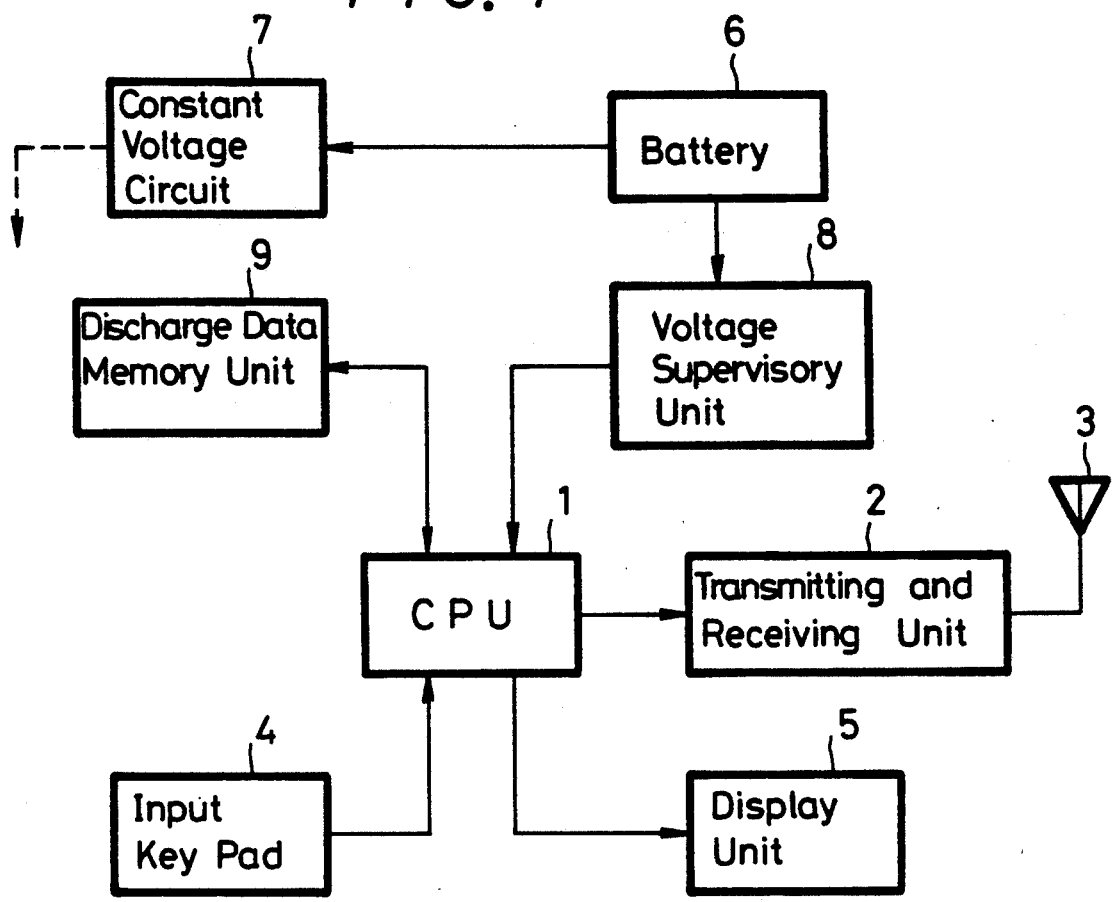
FIG. 1 is a block diagram showing an embodiment of a transmitter having battery power detecting means according to the present invention.

FIG. 1 shows an overall arrangement of an embodiment of the transmitter according to this invention in the form of a schematic block diagram. Referring to FIG. 1, a central control apparatus 1 is formed of a central processing unit (CPU) and is adapted to control the transmission and reception operation at a transmitting and receiving unit 2. A transmitting and receiving antenna 3 is connected to the transmitting and receiving unit 2 so as to transmit data by a satellite line network via, for example, a predetermined geostationary satellite (not shown).

The CPU 1 is connected with an input key pad 4 having operation keys (not shown) for inputting transmission informations or the like and a display unit 5 for displaying on a picture screen thereof (not shown) received content, transmitted content and messages such as when the battery is dead or the like. Various informations are transmitted on the basis of the operation of keys on the input key pad 4. When transmitting transmission data, the CPU 1 temporarily stores the transmission data. Then, only when the CPU 1 determines on the basis of the judged result provided by the calculation, which will be described later, that the transmission is possible, then the transmission data is transmitted from the CPU 1 to the transmitting and receiving unit 2, which then effects the transmission of transmission data through the antenna 3.

Further, this transmission apparatus is driven by a voltage supplied from a battery 6 formed of secondary batteries such as an Ni-Cd alkaline battery and so on.

More specifically, an output voltage from the battery 6 is supplied through a constant voltage circuit 7 to respective circuits of this communication apparatus.

A voltage supervisory unit 8 is provided to detect the output voltage of the battery 6 and, output voltage data detected from the voltage of the battery 6 by the voltage supervisory unit 8 is supplied to the CPU 1. Also, a discharge data memory unit 9 is connected to the CPU 1 to store a discharge characteristic of the battery 6 and, the discharge characteristic data stored in the discharge data memory unit 9 is read out therefrom under the control of the CPU 1. An example of discharge characteristic data is represented in FIG. 2.

Figure 2:
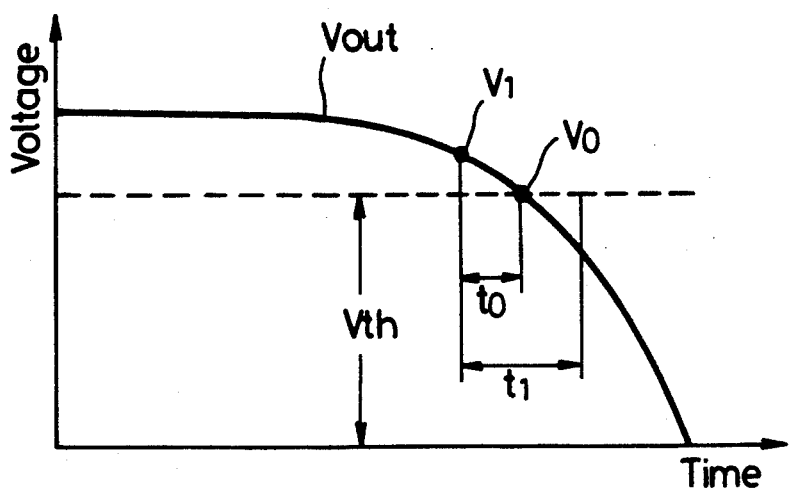
FIG. 2 is a graph illustrating an example of discharge characteristics.

Under the condition that the output voltage Vout is changed as shown in FIG. 2 when a current necessary for transmission is successively discharged from the battery 6, transition states of the output voltage Vout at every unit time are stored in the discharge data memory unit 9 as the discharge characteristic data. In that event, the discharge data memory unit 9 stores discharge characteristic data (data up to a point $V_0$ of FIG. 2) in which the present voltage value reaches a lowest voltage value Vth so that the voltage can be maintained as a constant voltage necessary for driving the respective circuits by the constant voltage circuit 7.

When transmission data is transmitted from the transmitting and receiving unit 2, then the CPU 1 calculates on the basis of the output voltage data supplied from the voltage supervisory unit 8 and the discharge characteristic data read out from the discharge data memory unit 9 the amount of data which can be transmitted by the output voltage of the battery 6. This operation of the CPU 1 will be described with reference to a flowchart forming FIG. 3.

Referring to FIG. 3, following the Start of operation, the processing proceeds to step S1. In step S1, when transmitting data, the CPU 1 calculates the amount of data transmitted and also calculates on the basis of the detected amount of data a period of time necessary for transmitting the data. The processing then proceeds to the next step S2, whereat the amount of the present output voltage of the battery 6 is detected from the output voltage data supplied from the voltage supervisory unit 8. Then, the processing proceeds to the next decision step S3. In decision step S3, data corresponding to the detected voltage value is read out from the discharge characteristic data stored in the discharge data memory unit 9 by the CPU 1, wherein a time in which the present voltage value reaches the lowest voltage value Vth necessary for operating the respective circuits is detected. Then, it is determined whether or not the time necessary for transmission is shorter than the time in which the present voltage value reaches the lowest voltage value Vth.

If the time necessary for transmission is shorter than the time in which the present voltage value reaches the lowest voltage value Vth as represented by a YES at decision step S3, then it is determined that the transmission is possible and the processing proceeds to step S4. In step S4, transmission data is supplied from the CPU 1 to the transmitting and receiving unit 2, from which the transmission data is transmitted. Then, the processing is ended.

If on the other hand the time necessary for transmission is longer than the time in which the present voltage value reaches the lowest voltage value Vth as represented by a NO at decision step S3, then it is determined that the transmission is impossible and the processing proceeds to step S5. In step S5, transmission data is not transmitted to the transmitting and receiving unit 2 and a message such as the exchange of battery 6 (or the charging of battery 6) is displayed on the display unit 5.

With reference to FIG. 2, let us now describe more fully the example in which the CPU 1 determines whether or not the transmission of data is possible.

As shown in FIG. 2, when the present output voltage of the battery 6 is, for example, $V_1$, then it is determined by the CPU 1 on the basis of the discharge characteristic data of this voltage $V_1$ the duration of time $t_0$ in which the voltage $V_1$ reaches the voltage value Vth which is necessary for transmission. Then, it is determined by the CPU 1 whether or not a time period $t_1$ necessary for transmitting present transmission data is shorter than the time $t_0$. At that time, since the time period $t_1$ necessary for transmitting the data is longer than the time period $t_0$ in which the voltage $V_1$ becomes lower than the voltage value Vth, it is determined by the CPU 1 that the data transmission is impossible. Therefore, the transmission of data is inhibited from being executed and the message indicative of the exchange of battery 6 is displayed on the display unit 5.

As described above, according to the transmitter of this embodiment, when the charged amount of battery is not sufficient for transmitting data, the data transmission can be reliably inhibited from being effected and a trouble in which the battery has run down during transmission can be avoided. Therefore, the transmitter of this embodiment is high in reliability. Also, in such case, since the message indicating the exchange of battery is displayed on the display unit, the time for exchanging the battery can be determined reliably and the transmitter of this embodiment is easy to handle.

While the exchange of battery 6 is instructed by the display unit 5 in the form of message when the charged amount of battery 6 necessary for transmission is not sufficient as described above, some suitable means such as a buzzer or the like may be utilized to warn the user of the condition such that the battery is weak or dead.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

What is claimed is:

1. A transmitter having a battery therein and which is driven by a voltage supplied from said battery, comprising:
   (a) input means for inputting transmission data;
   (b) data length detecting means connected to said input means for detecting a length of said transmission data;
   (c) voltage supervisory means connected to said battery for detecting an output voltage of said battery;
   (d) discharge characteristic memory means for storing discharge characteristic data of said battery;
   (e) transmitting and receiving means for transmitting said transmission data; and
   (f) calculating means connected to said voltage supervisory means, said discharge characteristic memory means, said data length detection means, and said transmitting and receiving means for calculating a data length which can be transmitted on the basis of a value of said output voltage detected by said voltage supervisory means and said discharge characteristic data stored in said discharge characteristic memory means, wherein when said data length detected by said data length detecting means is longer than said data length which can be transmitted, said transmission data is inhibited from being transmitted from said calculating means to said transmitting and receiving means.

2. A transmitter according to claim 1 wherein said data length detecting means and said calculating means further comprises data memory means for storing said transmission data.

3. A transmitter according to claim 2, further comprising display means connected to said calculating means for displaying that said transmission data is inhibited from being transmitted.

4. A transmitter according to claim 2, wherein said transmitter is a portable transmitter.

5. A transmitter utilizing a battery as a power source, comprising:

(a) means for calculating a data transmission time period, said data transmission time period being a time required to transmit a set of data signals;
(b) means for calculating a battery transmission time period, said battery transmission time period being a maximum time that said battery can power a transmission by said transmitter; and
(c) means for inhibiting a transmission of said data signals by said transmitter if said data transmission time period is longer than said battery transmission time period.

6. A method for transmitting data with a transmitter utilizing a battery as a power source, comprising:

(a) calculating a data transmission time period, said data transmission time period being a time required to transmit a set of data signals;
(b) calculating a battery transmission time period, said battery transmission time period being a maximum time that said battery can power a transmission by said transmitter; and
(c) inhibiting a transmission of said data signals by said transmitter if said data transmission time period is longer than said battery transmission time period.

* * * * *